(No Model.) 2 Sheets—Sheet 1.

J. H. MITCHELL.
MACHINE FOR SHEETING DOUGH.

No. 359,273. Patented Mar. 15, 1887.

WITNESSES:

INVENTOR
J. Henry Mitchell
By Hollingsworth & Whey
ATTORNEYS.

(No Model.) 2 Sheets—Sheet 2.

J. H. MITCHELL.
MACHINE FOR SHEETING DOUGH.

No. 359,273. Patented Mar. 15, 1887.

WITNESSES:
F. W. West
Henry N. Paul Jr.

INVENTOR
J. Henry Mitchell
By Hollingsworth & Haley
ATTORNEYS.

UNITED STATES PATENT OFFICE.

J. HENRY MITCHELL, OF PHILADELPHIA, PENNSYLVANIA.

MACHINE FOR SHEETING DOUGH.

SPECIFICATION forming part of Letters Patent No. 359,273, dated March 15, 1887.

Application filed March 25, 1886. Serial No. 196,488. (No model.)

*To all whom it may concern:*

Be it known that I, J. HENRY MITCHELL, of Philadelphia, in the State of Pennsylvania, have invented certain new and useful Improvements in Machines for Sheeting Dough.

The following is a specification of my said improvements, reference being had to the accompanying drawings, wherein—

Figure 1:
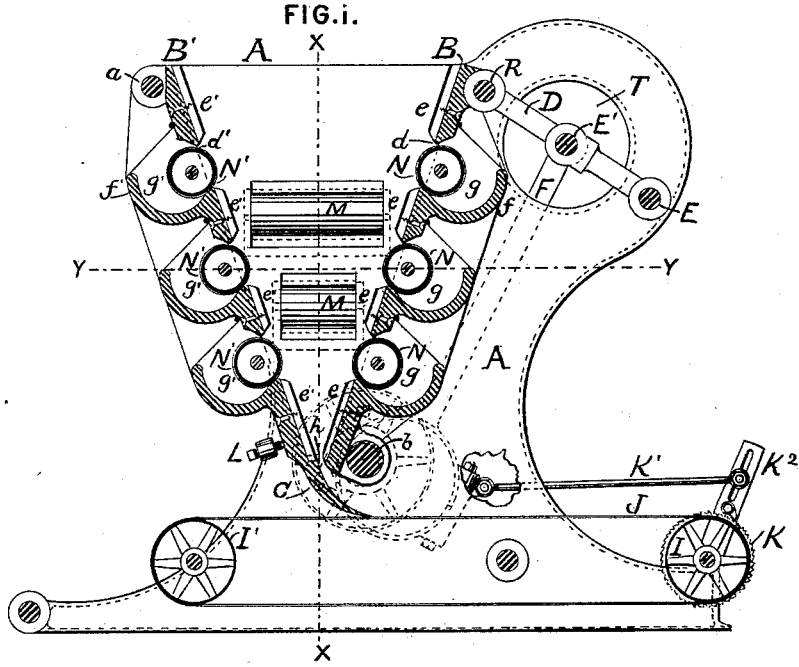
Figure 2:
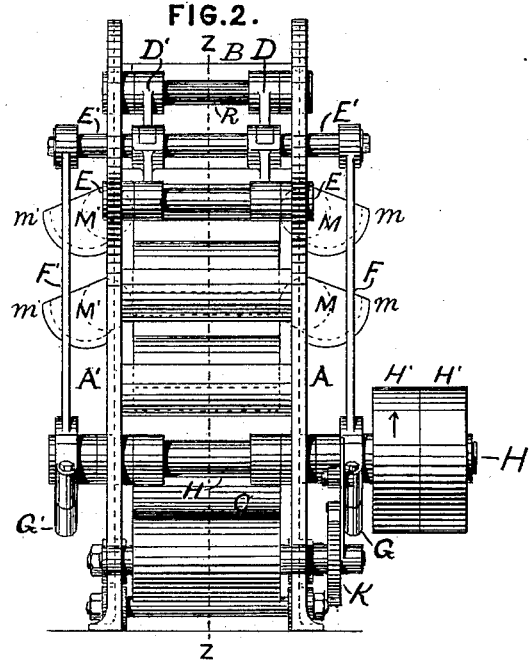
Figure 3:
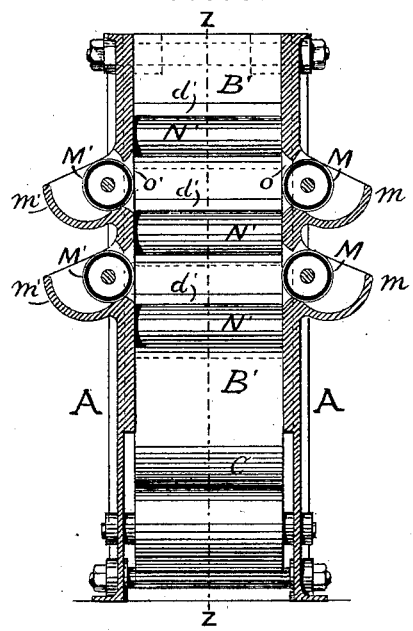
Figure 4:
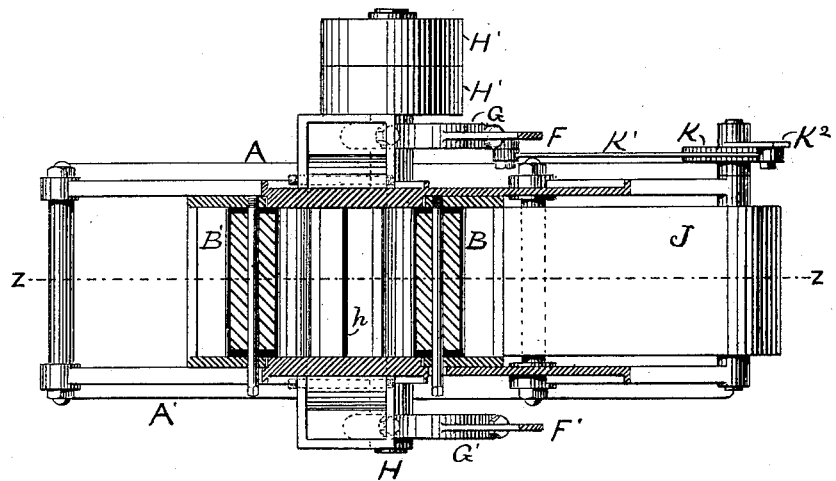
Figure 5:
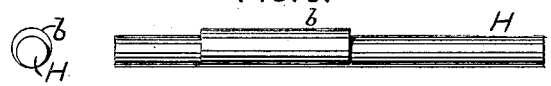

Figure 1 represents a vertical longitudinal section through the machine; Fig. 2, an end view thereof taken from the right-hand side of Fig. 1; Fig. 3, a vertical transverse section; Fig. 4, a horizontal section thereof on the line Y Y in Fig. 1, and Fig. 5 is a detailed view of the eccentric-shaft forming part of the actuating mechanism.

The object of my invention is to form dough into sheets by rapid intermittent compressing motion, which reduces it from a lump or mass into a sheet of any desired thickness, and to deliver it at the close of the operation onto an endless belt or other convenient transferring device. The motion required for this purpose is a peculiar compound oscillation, which I obtain by means of the mechanical device, hereinafter described; and I also provide means for supplying flour to the dough in its passage to the machine so that it shall not stick to the sides thereof.

In the drawings, A A' represent the sides of the machine, which support all the working parts. These sides are parallel, and between them and at right angles to their plane are arranged the compressors B B'. The compressors are two planes intersected at intervals by transverse openings $d\ d'$, extending across their entire width, and have along each vertical edge deep flanges $f\ f'$, which fit snugly in between the sides A A'. The proximate surface of the compressors are covered with felts $e\ e'$, or other similar material, which can be removed for cleaning. Adjacent to the outside of each of the openings $d\ d'$ are transverse pockets $g\ g'$, in which rollers N N' rotate upon suitable journals in the flanges $f\ f'$. The rollers are also covered with felt or other similar material, and are so arranged relatively to the openings that they extend partly out through the same, while the rear portion of their periphery is within the pocket adjacent to it. The sides A A' are also provided with similar pockets, $m\ m'$, in which the rollers M M' rotate, part of their surfaces being exposed through openings $o\ o'$ in the sides A A'. One of the compressors, B', is stationary during the operation of the machine, but is freely pivoted upon a transverse shaft, $a$, supported in the sides A A', so that it can be adjusted by means of a set-screw, L, placed near its lower end, for a purpose which will hereinafter be explained. The other compressor, B, is journaled at its bottom upon the eccentric $b$ of a rotating shaft, H, which is journaled in the sides A A'. This shaft H is the driving-shaft of the machine, and is supplied with power by means of a pulley, H'. The compressors B B' thus form, together with the sides A A', a wedge-shaped compressing-chamber, all of whose sides have openings with rollers rotating in them and extending into pockets in the rear of such openings, two of said sides being permanently stationary, a third, B', being stationary during the operation of the machine, but adjustable, while the fourth side, B, which forms the active compressing member, is journaled eccentrically at its bottom and oscillated at its top in a manner which will now be described.

In suitable housings near the top of the apparatus I provide two toggle-arms, D D', respectively, one on each side of the machine. These toggle-arms are journaled upon a fixed shaft, E, at one end, while the other end is pivoted upon a shaft, R, secured to the upper part of the compressor B. The central joint of the toggle-arms is made upon a transverse shaft, E', which extends out through openings T in each of the housings, so as to project beyond the same on each side.

To the projecting ends of this shaft E' are attached connecting-rods F F' on each side of the machine, and said connecting-rods at their lower ends have straps which surround eccentrics G G', mounted upon the shaft H, (which also forms the support for the lower end of the compressor B,) outside of the sides A A'.

As will be seen by reference to Fig. 1, the compressors B B' do not meet at the bottom, there being a small opening, $h$, between them, which extends entirely across the chamber, and the side B' is provided with a downwardly-depending curved chute, C, whose lower end is adjacent to an endless belt, J, moved by pulleys I I'. The pulley I is provided with a pawl-and-ratchet device, K K², actuated by means of a connecting-rod, K', from the eccentric G, so as to cause an intermittent slow travel of the belt J toward the right in Fig. 1.

By reference to the foregoing description it will be seen that the compressor B has two movements—one an oscillation upon the shaft H as a center, the other an oscillation upon the shaft R as a center. The first of these oscillations is effected by means of the toggle-arms D D', which, for each complete revolution of their eccentrics G G', cause a double oscillation of the compressor upon the shaft H as a center, since each time that the toggle-arms D D' pass their own center they will throw the compressor B to its extreme innermost position, and when they are at the position farthest from their center they will draw said compressor B to its extreme outward position, and for each rotation of the eccentrics G G' the toggle-joints will pass their centers twice and be in their extreme outward position twice. During this action, however, the rotation of the shaft H has also, by means of the small eccentric surface $b$, oscillated the compressor B from the lower end thereof, the center of oscillation being the shaft R at its top, so that the compressor B describes at each rotation of the driving-shaft H a compound oscillating motion, which tends not only to compress the dough within the compression-chamber, but to expel it through the transverse opening at the bottom thereof and cause it to slide down the chute C onto the endless traveling belt. This motion I have found reduces the dough from a mass or lump into a sheet in the most efficient manner.

The function of the rollers N N' M M' is to supply flour or other dry-dusting material to the dough in its passage. Said flour is placed in the pockets, which are adjacent to the several rollers, and, as the dough in its passage causes the said rollers to rotate, they carry out the flour on their surfaces and supply it to the dough. Thus the dough will not stick to the rollers, nor to the compressing-surfaces, but will pass freely down and out in a thin sheet through the opening $h$ at the bottom of the compressing-chamber. The width of the opening $h$ can be adjusted by means of the set-screw L, so as to reduce or increase the thickness of the sheets of dough at will.

I have found that a very small range of motion will suffice for the oscillation of the compressor. Thus the throw of the toggle-arms D D' need not be greater than a half-inch, and the eccentricity of the shaft H at the point where the compressor is journaled thereon may be as small as the thirty-second of an inch. These dimensions are much exaggerated in the drawings annexed hereto in order to show more clearly the method of construction; but with a very rapid movement the extent of oscillation may be made very small. I therefore do not desire to limit myself to any particular amount of motion for the compressor B, nor to the exact form in which my invention is embodied, since various means may be adapted to give to the side or sides of the compression-chamber a compound oscillation.

Although I have described the invention as applied to the sheeting of dough, I do not limit myself to its use for that particular material, since it is well adapted for the sheeting of materials used in confectionery, &c., especially where the material has little or no fiber, and, consequently, but slight tenacity.

Experience with the present forms of sheeting-machines has satisfied me that where dough is "short," or has but little cohesion, it cannot be satisfactorily sheeted by means of rollers or similar devices which have a simple rotating motion, nor by kneaders which have a parallel motion. The peculiar compound oscillation which results from journaling one or more sides of a compressed chamber upon different centers gradually works the dough down to the outlet of the chamber and then expels it without excessive pressure in a continuous stream or sheet.

Having thus described my invention, I claim, in a machine for sheeting dough, &c.—

1. The combination, with a compressing-chamber which converges downwardly and has an ejecting-aperture in its bottom, of a compressor, an oscillating device journaled thereto near one end, and a second oscillating device, also journaled thereto near the other end, and having a shorter throw than the first, whereby a compound oscillation of said compressor upon said journaled points is effected, substantially in the manner set forth.

2. The combination, with a compressing-chamber one of whose sides is provided with independently-journaled oscillating devices of different throw, whereby a compound oscillating movement is imparted thereto, of a stationary compressor opposite to said moving side, and having its lower end adjustable toward and from said moving side, whereby the width of the ejecting-aperture at the bottom of said chamber may be varied, substantially as set forth.

3. The combination of the sides A A', adjustable stationary compressor B', movable compressor B, journaled near its upper end upon a shaft, R, and near its lower end upon an eccentric, $b$, the toggle-arms D D', and driving mechanism whereby said toggle-arms and said eccentric are actuated, substantially as set forth.

J. HENRY MITCHELL.

Witnesses:
WM. H. MYERS,
F. W. WEST.